G. W. ZEIGLER.
Cultivator.
No. 53,212.  Patented Mar. 13, 1866.
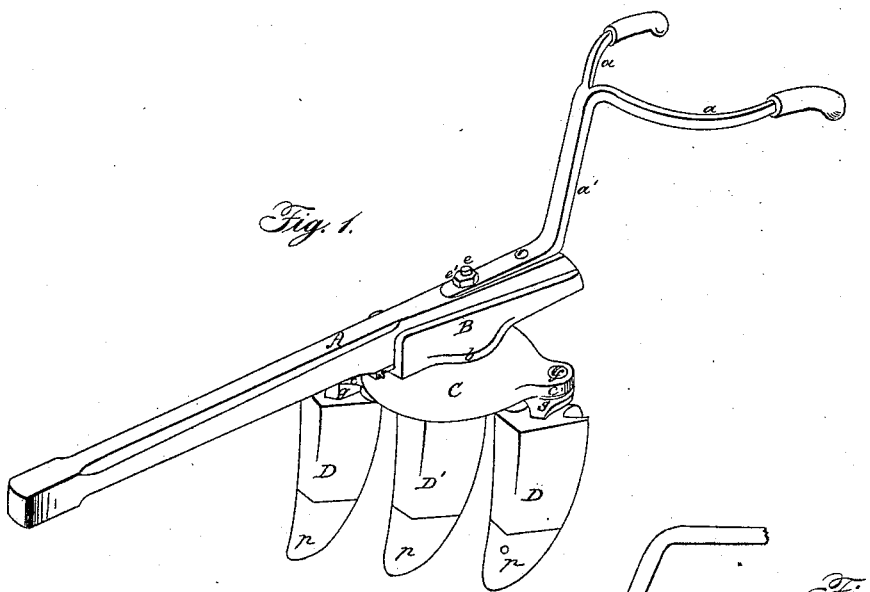
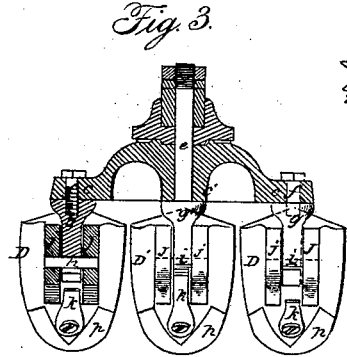
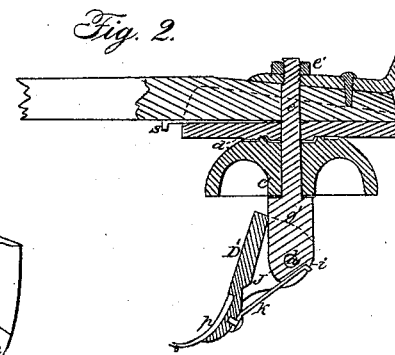
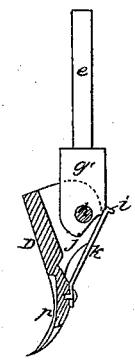
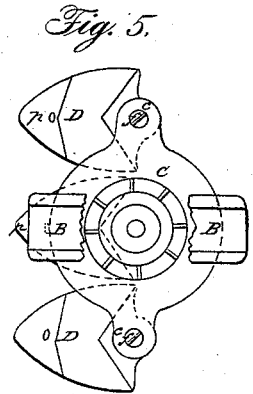
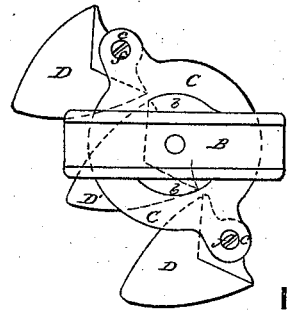
Witnesses:  Inventor:

UNITED STATES PATENT OFFICE.

GEORGE W. ZEIGLER, OF TIFFIN, OHIO.

IMPROVEMENT IN CULTIVATORS.

Specification forming part of Letters Patent No. 53,212, dated March 13, 1866.

*To all whom it may concern:*

Be it known that I, GEORGE W. ZEIGLER, of Tiffin, in the county of Seneca and State of Ohio, have invented a new and Improved Cultivator; and I do hereby declare that the following is a full, clear, and exact description thereof, reference being had to the accompanying drawings, making a part of this specification, in which—

Figure 1 is a perspective view of the cultivator complete. Fig. 2 is a longitudinal section taken in a vertical plane through the center of the cultivator. Fig. 3 is a transverse section taken in a vertical plane through the beam, its flanged and adjusting plates, and one of the shovels, the other shovels being represented by a rear view. Fig. 4 is a sectional view, showing the point of a tooth thrust back. Figs. 5 and 6 are top views, showing the adjusting-plate and its shovels in several positions.

Similar letters of reference indicate corresponding parts in the several figures.

One object of this invention is to so construct a shovel-plow or cultivator that the shovels can be adjusted laterally about a center and set obliquely with respect to the beam; also, so that each shovel can be adjusted independently of the main supporting-plate and of each other, as will be hereinafter described.

Another object of my invention is to pivot the shovels to their standards, and to provide each shovel with a spring-holder in such manner that the shovels will be held firmly in position against any ordinary pressure, and when they meet with an obstruction which would be liable to break the machine said spring-holder shall allow the points of the shovels to move backward and pass uninjured over the obstruction, as will be hereinafter described.

Another object of my invention is to construct the shovels with detachable points in such manner that when these points are worn out they can be removed and others substituted in their stead, thus obviating the necessity of renewing the entire shovel when its point is worn out, as will be hereinafter described.

Another object of my invention is to provide for adjusting the shovels and securing them in any desired position with respect to their beam by means of a single bolt, about which all the shovels can turn, as will be hereinafter described.

To enable others skilled in the art to understand my invention, I will describe its construction and operation.

In the accompanying drawings, A represents the beam of the cultivator, and $a$ $a$ are the handles, which are formed upon a bar, $a'$, that is bolted to said beam. B represents a casting, which is constructed with side flanges on its upper side and a flat circular enlargement, $b$, on its lower side, which enlargement forms an upper horizontal bearing for a convex shovel-holding plate, C. This plate is constructed with lugs or offsets $c$ $c$ projecting from its circumference diametrically opposite each other. It is also constructed with a central bearing, $c'$, and with a circular flat surface on top corresponding to the circular bearing-surface $b$ on the bottom of the flanged casting B.

To prevent lateral displacement of the convex shovel-holder C a circular tenon may be formed on the bottom of the casting B concentric to the axis of the vertical bolt $e$, which tenon shall fit loosely into a corresponding recess formed in the center of the circular surface on the top of the casting C, as shown in Figs. 2 and 3. The flanged casting B is also constructed with one or more spurs, $d$, projecting from its bottom surface, which are intended to enter notches formed in the surface of the holder C, and thus prevent this holder from turning about its axis when bolted to the casting B, as shown in Figs. 2 and 3. There should be a number of notches in the flat surface of the holder C to receive the pin or spur $d$, in whatever position it may be desired to adjust the shovels.

The bolt $e$ passes up centrally through the plates C B and the beam A, and receives a nut, $e'$, upon its upper end, by means of which nut the said parts are rigidly secured together. When it is desired to adjust the shovels with their holding-plate C the nut $e'$ is loosened until the spur $d$ will clear its notches by separating the plate C from its plate B. The latter plate can thus be moved about its axis.

The shovels D D′ D are pivoted to standards $g$ $g'$ $g$, which have enlarged cylindrical upper ends with flat upper surfaces. The standard $g'$ is cast or otherwise produced with a bolt, $e$, above referred to, so that this bolt serves to secure the shovel D', the plate C, the plate B, and the beam A together. The upper ends of the standards $g\ g$ of the shovels D D are secured to the lugs of the plate C by means of screws $f\ f$, which are tapped into these standards $g\ g$, or they may have pins formed on them to receive nuts, as described, for the pin or bolt $e$. If desirable, spurs and notches may be formed on the surfaces which are brought together when the shovel-standards are secured in their places.

The lower portions of these standards $g\ g'\ g$ are flattened, and shoulders are formed on their rear edges, as shown at $i\ i\ i$, Figs. 2, 3, and 4. These standards are received between lugs $j\ j$, which are cast on the backs of their shovels D D' D, and the transverse pivots $h$ are used for connecting the shovels to their respective standards. To each shovel a strong spring, $k$, is secured, below the point of connection of the shovel with its standard. The upper end of said spring may be rounded or bent, as shown in Figs. 2 and 4, and this end abuts against the shoulder at $i$, so that the spring serves as a brace for keeping the shovel in a proper position and resisting any ordinary pressure which may be brought against the point. Should the shovel meet with an obstruction in its path which would be liable to break or derange the cultivator, the upper end of the spring $k$ will slip from its shoulder at $i$ and allow the point of the shovel to swing back and pass freely over the obstruction, when the shovel may be adjusted to its proper position and held as before.

The shovels are constructed with detachable points $p$, which are fitted to the main portions of these shovels so as to leave a smooth surface. These shovel-points may be made of steel or hardened cast-iron and secured in place by means of screws passing through the back part of the main portion of the shovel. When the points $p$ are worn out they can be removed from the main portion of the shovels and new points inserted in their places.

It will be seen from the above description that the plows or shovels can all be adjusted at the same time and set so as to throw the earth either toward or from the plants or hills. If it is desired, the two outside shovels, D D, can be removed and the lugs on plate C turned in a line with the beam A, so as to use only a single shovel. Each shovel of my cultivator can be adjusted independently of the other, or all the shovels can be adjusted simultaneously.

The plow-beam A is adjusted upon the casting B by means of a wedge, $s$, inserted at the front end of the portion B, as shown in Fig. 1. By means of this wedge the plow-beam can be adjusted and set at different angles with respect to the vertical bolt $e$, so as to regulate the depth at which it is desired to run the shovels.

Having thus described my invention, what I claim as new, and desire to secure by Letters Patent, is—

1. Constructing the shovel-plow with a movable cross-arm or plate, C, and so arranging the same that the shovels can all be moved either to the right or left of the beam in oblique directions to the line of draft, substantially as specified.

2. The application of spring-braces $k$ to the pivoted shovels and their standards, substantially as described.

3. The construction of the shovel-holding plate C with lugs $c\ c$ to receive the outside shovel-standards, and also with a flat upper surface, having notches in it to receive spurs which project from the bottom surface of the flanged casting B, substantially as described.

4. The construction of the central standard, $g'$, with a pin, $e$, so that the plates C B can be secured to the beam A in the act of securing the central shovel to the plow, substantially as described.

5. The combination of the flanged casting B with the shovel-holder C, these two parts being constructed substantially as described.

6. The construction of the shovels with detachable points $p$, substantially as described.

7. Providing for adjusting all the shovels about a central axis simultaneously, when these shovels are attached to standards that can be adjusted and secured in position independently of each other, substantially as described.

GEORGE W. ZEIGLER.

Witnesses:
A. H. BYERS.
J. H. FEIDT.